US008528520B2

(12) United States Patent
Kronich

(10) Patent No.: US 8,528,520 B2

(45) Date of Patent: Sep. 10, 2013

(54) MOTOR VEHICLE AND OPERATING METHOD FOR AN INTERNAL COMBUSTION ENGINE

(75) Inventor: Alexander Kronich, Rutesheim (DE)

(73) Assignee: Dr. Ing. H.C.F. Porsche Aktiengesellschaft, Stuttgart (DE)

(*) Notice: Subject to any disclaimer, the term of this patent is extended or adjusted under 35 U.S.C. 154(b) by 964 days.

(21) Appl. No.: 12/623,024

(22) Filed: Nov. 20, 2009

(65) Prior Publication Data

US 2010/0186712 A1 Jul. 29, 2010

(30) Foreign Application Priority Data

Jan. 28, 2009 (DE) ......................... 10 2009 006 472

(51) Int. Cl.

*F02D 41/00* (2006.01)
*B60K 28/16* (2006.01)
*B60K 31/00* (2006.01)

(52) U.S. Cl.

USPC .......................................... 123/350; 701/110

(58) Field of Classification Search

USPC ............. 123/350, 399, 401, 198 D, 198 DA; 701/110, 112; 180/172

See application file for complete search history.

(56) References Cited

U.S. PATENT DOCUMENTS

| | | | | |
|---|---|---|---|---|
| 5,655,995 | A * | 8/1997 | Kondo et al. | 477/155 |
| 6,092,005 | A * | 7/2000 | Okada | 701/1 |
| 6,363,309 | B1 * | 3/2002 | Irie et al. | 701/70 |
| 6,732,039 | B2 * | 5/2004 | Ino et al. | 701/93 |
| 6,778,896 | B1 * | 8/2004 | Matsuura et al. | 701/70 |
| 6,792,344 | B2 * | 9/2004 | Minowa et al. | 701/96 |
| 6,843,538 | B1 * | 1/2005 | Nagae et al. | 303/146 |
| 7,016,777 | B2 * | 3/2006 | Suzuki et al. | 701/70 |
| 7,065,442 | B2 * | 6/2006 | Sakata | 701/72 |
| 7,082,358 | B2 * | 7/2006 | Sugo | 701/34.3 |
| 2004/0093144 | A1 * | 5/2004 | Ishizu et al. | 701/93 |
| 2005/0216162 | A1 * | 9/2005 | Suzuki et al. | 701/70 |
| 2007/0056653 | A1 * | 3/2007 | Schmidt et al. | 141/95 |
| 2008/0221760 | A1 * | 9/2008 | Wakamatsu et al. | 701/52 |
| 2009/0037053 | A1 * | 2/2009 | Yamazaki | 701/41 |
| 2009/0150039 | A1 * | 6/2009 | Perisho et al. | 701/93 |
| 2010/0186712 | A1 * | 7/2010 | Kronich | 123/350 |

FOREIGN PATENT DOCUMENTS

DE 42 30 560 A1 3/1994

* cited by examiner

*Primary Examiner* — Stephen K Cronin

*Assistant Examiner* — Arnold Castro

(74) *Attorney, Agent, or Firm* — Leydig, Voit & Mayer, Ltd.

(57) ABSTRACT

A motor vehicle, in particular a passenger car, has an internal combustion engine and an engine control unit. In order to avoid insufficient lubrication, the engine control unit is configured and/or programmed in such a way that it reduces a rotational speed of the internal combustion engine if a predetermined maximum lateral acceleration of the vehicle is present for longer than a predetermined maximum time period.

10 Claims, 1 Drawing Sheet

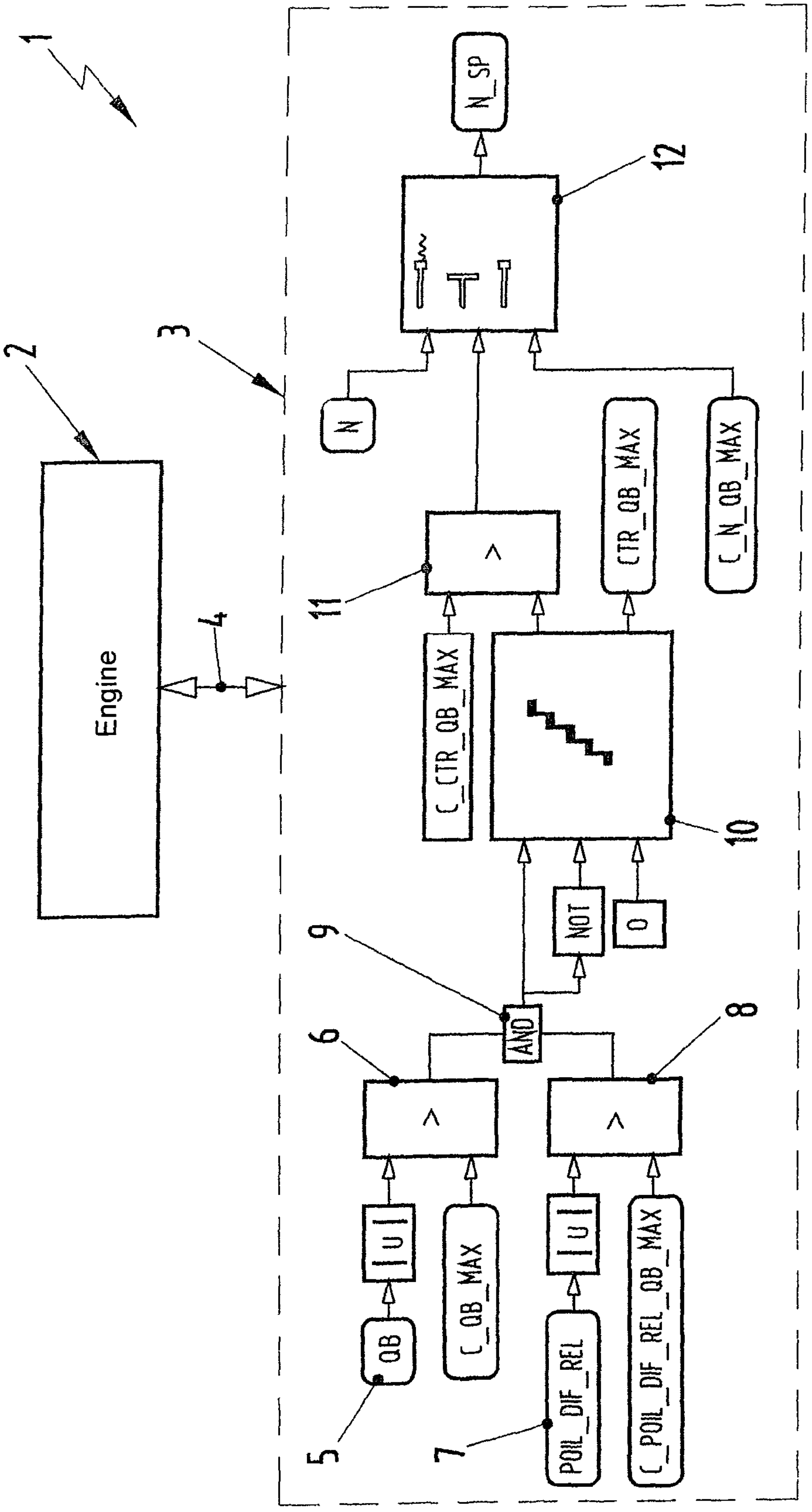
1
2
3
4
Engine
N_SP
12
N
CTR_QB_MAX
C_N_QB_MAX
11
C_CTR_QB_MAX
10
NOT
0
9
AND
6
8
|u|
|u|
QB
C_QB_MAX
POIL_DIF_REL
C_POIL_DIF_REL_QB_MAX
5
7

MOTOR VEHICLE AND OPERATING METHOD FOR AN INTERNAL COMBUSTION ENGINE

CROSS-REFERENCE TO RELATED APPLICATION

This application claims the priority, under 35 U.S.C. §119, of German application DE 10 2009 006 472.9, filed Jan. 28, 2009; the prior application is herewith incorporated by reference in its entirety.

BACKGROUND OF THE INVENTION

Field of the Invention

The present invention relates to a motor vehicle, in particular a passenger car. The invention also relates to a method for operating an internal combustion engine, in particular in a motor vehicle.

In internal combustion engines with a horizontal or virtually horizontal cylinder arrangement there is generally the problem of feeding back the quantity of lubricating oil which accumulates in the cylinder head. For example, return pipes which lead into the oil sump from the cylinder head can be arranged underneath the cylinders in order to avoid the accumulation of relatively large quantities of oil in the cylinder heads. In this context, relatively long cornering situations, in particular under motorsport conditions, are problematic. The lateral accelerations which occur in such a situation hold the lubricating oil, which usually flows back as a result of gravitational forces, in the cylinder heads. Such states impede or prevent an adequate supply of lubricating oil to the rest of the internal combustion engine and they can lead to serious damage to the internal combustion engine within a short time.

Published, non-prosecuted German patent application DE 42 30 560 A1 discloses an internal combustion engine in which filler bodies for reducing the volume are arranged in an oil-conducting space of the cylinder head. These filler bodies prevent the accumulation of relatively large quantities of oil in the cylinder head. However, accommodating such filler bodies can be problematic since they must not impede movable elements of the internal combustion engine which may be arranged in the vicinity of the cylinder head, for example a valve drive.

SUMMARY OF THE INVENTION

It is accordingly an object of the invention to provide a motor vehicle and an operating method for an internal combustion engine, which overcome the above-mentioned disadvantages of the prior art devices and methods of this general type, which is an improved embodiment which is distinguished in particular by the fact that the risk of reduced oil lubrication is reduced, while in particular there is to be no structural intervention into the internal combustion engine.

With the foregoing and other objects in view there is provided, in accordance with the invention, a motor vehicle. The motor vehicle contains an internal combustion engine and an engine control unit configured and/or programmed such that the engine control unit reduces a rotational speed of the internal combustion engine if a predetermined maximum lateral acceleration of the motor vehicle is present for longer than a predetermined maximum time period.

The invention is based on the general idea of operating the vehicle or the internal combustion engine in such a way that a predetermined, maximum permissible lateral acceleration of the vehicle is permitted for only a specific, predefinable maximum time period depending on the rotational speed of the internal combustion engine. As soon as this maximum time period is reached, the rotational speed of the internal combustion engine is reduced. As a result, the lateral acceleration also decreases, and this favors the feeding back of the lubricating oil and promotes adequate lubrication of the internal combustion engine. In this context, the invention makes use of the realization that different maximum lateral accelerations and/or different maximum time periods can be permitted depending on the current rotational speed of the internal combustion engine, without the internal combustion engine being damaged. This ensures that the throttling of the internal combustion, that is to say the forced reduction of the rotational speed, which is undesired per se occurs only under extreme loads, that is to say when the internal combustion engine faces a serious threat. In the case of the embodiment according to the invention, it is particularly advantageous that it can be implemented without structural changes to the internal combustion engine since acceleration sensors, in particular lateral acceleration sensors, are usually present in any case in modern motor vehicles. Therefore, in order to implement the invention, all that is necessary is for an engine controller to be appropriately programmed or adapted.

In order to optimize the automatic reduction in the rotational speed, there may be provision, according to advantageous embodiments, to predefine the maximum time period as a function of at least one parameter of the internal combustion engine or of the vehicle. For example, the maximum time period may depend on the current rotational speed of the internal combustion engine. The higher the current rotational speed, the shorter the maximum time period and the earlier the point at which the reduction in the rotational speed starts. The maximum time period may additionally or alternatively depend on the current lateral acceleration of the vehicle. The higher the current lateral acceleration, the shorter the maximum time period and the earlier the point at which the reduction in the rotational speed starts. Additionally or alternatively, it is also possible to provide for the maximum time period to be predefined as a function of a relative oil pressure difference in the lubrication circuit of the internal combustion engine. The greater the oil pressure difference, the shorter the maximum time period selected and the earlier the point at which the reduction in the rotational speed can start.

In contrast to the maximum time period, it is possible, in one embodiment, for the maximum lateral acceleration to be permanently predefined, which is to say to have a constant value, in particular, independently of the rotational speed, of the lateral acceleration or of the oil pressure difference.

Of course, the features which are mentioned above and which are to be explained below can be used not only in the respectively specified combination but also in other combinations or alone, without departing from the scope of the present invention.

Other features which are considered as characteristic for the invention are set forth in the appended claims.

Although the invention is illustrated and described herein as embodied in a motor vehicle and an operating method for an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a highly simplified, schematic basic illustration of a motor vehicle with a functional diagram of an operating method for an internal combustion engine of the vehicle according to the invention.

DETAILED DESCRIPTION OF THE INVENTION

Turning now to the single FIGURE of the drawing in detail, there is shown a motor vehicle 1 which is illustrated in only simplified form and which is preferably a passenger car, and in particular a motorsports car. The vehicle has an internal combustion engine 2 and an engine control unit 3, which are connected to one another in accordance with a double arrow 4. In order to avoid inadequate lubrication of the internal combustion engine 2 during relatively long cornering at high speed, the engine control unit 3 is configured and/or programmed in such a way that it automatically reduces a rotational speed N of the internal combustion engine 2 as soon as a predetermined maximum lateral acceleration C_QB_MAX of the vehicle is present for longer than a predetermined maximum time period C_CTR_QB_MAX. The reduction in the rotational speed N leads to a reduction in the lateral acceleration QB acting on the vehicle 1 and therefore on the internal combustion engine 2, and consequently brings about an improved supply of lubricating oil.

For this purpose, the engine control unit 3 is configured and/or programmed in such a way that it can carry out the method explained in more detail below. The method is an operating method for the internal combustion engine 2 which is located in the vehicle 1. The lateral acceleration QB acting on the vehicle 1 is monitored using at least one corresponding lateral acceleration sensor 5. The lateral acceleration QB is compared here with a predetermined maximum lateral acceleration C_QB_MAX. As soon as a corresponding comparison operator 6 determines that the current lateral acceleration QB exceeds the predetermined maximum lateral acceleration C_QB_MAX, a corresponding lateral acceleration message is generated. The lateral acceleration message is maintained here for as long as the current lateral acceleration QB is higher than the predetermined maximum lateral acceleration C_QB_MAX.

In the example shown, a current relative oil pressure difference POIL_DIF_REL, which occurs between a setpoint pressure and an actual pressure in a lubricating oil circuit of the internal combustion engine 2, is also optionally monitored using a corresponding oil pressure sensor 7. The current relative oil pressure difference POIL_DIF_REL is compared with a predetermined relative maximum oil pressure difference C_POIL-DIF_REL_QB_MAX in a comparison operator 8. A corresponding oil pressure message is generated as soon as and for as long as the current relative oil pressure difference POIL_DIF_REL exceeds the predetermined relative maximum oil pressure difference C_POIL_DIF_REL_QB_MAX.

The lateral acceleration message and the oil pressure message are fed to a timer 10 via a logic operation element 9. The timer 10 measures the time period as soon as and for as long as the lateral acceleration message or the oil pressure message is present or for as long as the lateral acceleration message and the oil pressure message are present. In the example, the logic operation is carried out with the timer 10 in such a way that the measured time period is reset to the value zero as soon as the current lateral acceleration QB drops again below the predetermined maximum lateral acceleration C_QB_MAX and/or as soon as the current oil pressure difference POIL_DIF_REL drops below the predetermined maximum oil pressure difference C_POIL_DIF_REL_QB_MAX.

In a further comparison operator 11, the time period which is determined or measured by the timer 10 is compared with a predetermined maximum time period C_CTR_QB_MAX. As soon as and for as long as the measured time period exceeds the predetermined maximum time period C_CTR_QB_MAX, a time message is generated and fed to a switching element 12. The switching element 12 receives, as further input signals, the current rotational speed N of the internal combustion engine 2 and a predetermined maximum rotational speed C_N_QB_MAX, which may be predetermined as a function of the current lateral acceleration. The dependence between the maximum permissible rotational speed C_N_QB_MAX and the current lateral acceleration QB can be stored in a corresponding characteristic diagram. The switching element 12 can then selectively reduce the rotational speed N of the internal combustion engine 2 as soon as and for as long as the abovementioned time message is present and the current rotational speed N is above the predetermined maximum rotational speed C_N_QB_MAX. The reduced rotational speed or rotational speed correction N_SP can be carried out here in predetermined rotational speed increments or continuously until the abovementioned time message disappears or until the rotational speed N drops below the predetermined maximum rotational speed C_N_QB_MAX. The reduction N_SP in the rotational speed can optionally also be selected to be of just such a magnitude that the current rotational speed N is anticipated to drop below the predetermined maximum rotational speed C_N_QB_MAX as a result of the intervention of the switching element 12 or of the engine control unit 3.

The maximum time period C_CTR_QB_MAX can itself depend on the current rotational speed N of the internal combustion engine 2. A corresponding dependence can, for example, be stored in a characteristic diagram. The maximum time period C_CTR_QB_MAX can additionally or alternatively depend on the current lateral acceleration QB of the vehicle 1. A corresponding dependence can also be stored in a characteristic diagram. The maximum time period C_CTR_QB_MAX can additionally or alternatively depend on the current relative oil pressure difference POIL_DIF_REL, for which purpose a corresponding characteristic diagram may also be provided.

As a result of the automatic reduction in the rotational speed N of the internal combustion engine 2, the lateral acceleration QB acting on the vehicle 1 can be reduced to such an extent that adequate lubrication of the internal combustion engine 2 with oil can be ensured. So that such an intervention into the operation of the engine, which is not desired by the vehicle driver, is permitted only in an extreme case in order to protect the internal combustion engine 2 and the vehicle 1, different parameters are taken into account, which results in a complex dependence between the individual control variables. In this context, the maximum permissible lateral acceleration C_QB_MAX may be predetermined as a constant value or else as a characteristic diagram which is dependent, for example, on the oil temperature and oil filling level, while the maximum time period C_CTR_QB_MAX and the maximum rotational speed C_N_QB_MAX are dependent on other parameters of the vehicle 1 or of the internal combustion engine 2. In the example, the specific maximum values are dependent at least on the current lateral acceleration QB. The maximum time period C_CTR_QB_MAX can also depend on the rotational speed N and on the current relative oil pressure difference POIL_DIF_REL.

The invention claimed is:

1. A motor vehicle, comprising:

an internal combustion engine; and an engine control unit at least one of configured and programmed such that said engine control unit reduces a rotational speed of said internal combustion engine if a predetermined maximum lateral acceleration of the motor vehicle is present for longer than a predetermined maximum time period, wherein the predetermined maximum time period depends on a current rotational speed of said internal combustion engine.

2. The motor vehicle according to claim 1, wherein the motor vehicle is a passenger car.

3. The motor vehicle according to claim 1, wherein the predetermined maximum time period depends on a current lateral acceleration of the motor vehicle.

4. A motor vehicle comprising:

an internal combustion engine; and an engine control unit at least one of configured and programmed such that said engine control unit reduces a rotational speed of said internal combustion engine if a predetermined maximum lateral acceleration of the motor vehicle is present for longer than a predetermined maximum time period, wherein the predetermined maximum time period depends on a relative oil pressure difference.

5. A method for operating an internal combustion engine in a motor vehicle, which comprises the step of:

reducing a rotational speed of the internal combustion engine if a predetermined maximum lateral acceleration of the motor vehicle is present for longer than a predetermined maximum time period, wherein a lateral acceleration message is generated as soon as and for as long as a current lateral acceleration exceeds the predetermined maximum lateral acceleration.

6. The method according to claim 5, which further comprises generating an oil pressure message as soon as and for as long as a current oil pressure difference in a lubricating oil circuit of the internal combustion engine exceeds a predetermined relative maximum oil pressure difference.

7. The method according to claim 6, which further comprises using a timer to measure a time period as soon as and for as long as one of the lateral acceleration message and the oil pressure message is present, or for as long as the lateral acceleration message and the oil pressure message are present.

8. method according to claim 7, which further comprises generating a time message as long as and as soon as the time period measured exceeds a predetermined maximum time period.

9. The method according to claim 8, which further comprises reducing the rotational speed of the internal combustion engine as soon as and for as long as the time message is present.

10. The method according to claim 5, which further comprises varying the predetermined maximum time period in dependence on at least one of a current rotational speed of the internal combustion engine, a current lateral acceleration of the motor vehicle, and a current relative oil pressure difference.

* * * * *